(12) United States Patent
Bier

(10) Patent No.: US 7,540,202 B2
(45) Date of Patent: Jun. 2, 2009

(54) APPARATUS FOR MEASURING FLOW OF A MEDIUM

(75) Inventor: Thomas Bier, Riehen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/579,589

(22) PCT Filed: May 4, 2005

(86) PCT No.: PCT/EP2005/052055

§ 371 (c)(1),
(2), (4) Date: Aug. 27, 2007

(87) PCT Pub. No.: WO2005/108933

PCT Pub. Date: Nov. 17, 2005

(65) Prior Publication Data

US 2008/0110280 A1    May 15, 2008

(30) Foreign Application Priority Data

May 5, 2004   (DE) ................. 10 2004 022 518

(51) Int. Cl.
*G01F 1/58* (2006.01)
(52) U.S. Cl. ................................. 73/861.12
(58) Field of Classification Search .. 73/861.11–861.17
See application file for complete search history.

(56) References Cited

U.S. PATENT DOCUMENTS

| | | | | |
|---|---|---|---|---|
| 2,669,873 A | | 2/1954 | Gardner | |
| 5,655,434 A | * | 8/1997 | Liebermann | 99/330 |
| 6,085,599 A | * | 7/2000 | Feller | 73/861.13 |
| 6,505,517 B1 | * | 1/2003 | Eryurek et al. | 73/861.08 |
| 6,530,285 B1 | | 3/2003 | Feller | |
| 6,615,419 B1 | * | 9/2003 | Chang | 4/524 |
| 6,983,661 B2 | * | 1/2006 | Zingg | 73/861.12 |
| 7,073,393 B2 | * | 7/2006 | Webb et al. | 73/861.12 |

FOREIGN PATENT DOCUMENTS

| | | |
|---|---|---|
| DE | 33 29 899 A1 | 3/1985 |
| DE | 196 16 281 C2 | 7/1996 |
| WO | WO 03/106932 A1 | 12/2003 |

* cited by examiner

*Primary Examiner*—Jewel Thompson
(74) *Attorney, Agent, or Firm*—Bacon & Thomas, PLLC

(57) ABSTRACT

An apparatus for measuring flow of a medium through a measuring tube directed along a longitudinal axis of the measuring tube. The apparatus includes: A magnet arrangement, which produces an alternating magnetic field ($\phi_1$, $\phi_2$) at two locations, wherein, at the first location, the magnetic field passes through the measuring tube transversely to the longitudinal axis of the measuring tube, wherein, associated with the measuring tube, is at least one measuring electrode, in which a measuring current dependent on the flow of the medium is induced, wherein the magnetic field is so developed at the second location, that it drives an electric motor; and at least one control/evaluation unit, which so controls the magnet arrangement, that, in each case, a magnetic field suited for operating the electric motor and the flow measuring arrangement is provided, and wherein the control/evaluation unit delivers, on the basis of the measuring voltage induced in the measuring electrode(s), information concerning the volume flow of the medium in the measuring tube.

8 Claims, 1 Drawing Sheet

APPARATUS FOR MEASURING FLOW OF A MEDIUM

FIELD OF THE INVENTION

The invention relates to an apparatus for measuring flow of a medium flowing through a measuring tube in the direction of a longitudinal axis of the measuring tube.

BACKGROUND OF THE INVENTION

Magneto-inductive flow measuring devices make use of the principle of electrodynamic induction for measuring volumetric flow. According to such principle, charge carriers of the medium moved perpendicularly to a magnetic field induce a voltage in measuring electrodes arranged essentially perpendicular to the flow direction of the medium and perpendicular to the magnetic field. The measuring electrodes are coupled with the medium either galvanically or capacitively. This voltage induced in the measuring electrodes is proportional to the flow velocity of the medium averaged over the cross section of the tube; it is, thus, proportional to the volume flow rate.

Usually, such flow measuring devices are integrated into a processing installation. The flow of a medium through a processing installation arises, frequently, not naturally, e.g. because of falling, but, instead, is produced by a pump. Pumps are usually driven by an electric motor. Just as a varying magnetic field is necessary for operating a magneto-inductive flow measuring arrangement, so also does the rotor of an electric motor rotate in a timewise-varying magnetic field. This circumstance is made use of in the apparatus of the present invention.

SUMMARY OF THE INVENTION

An object of the invention is to provide a cost-favorable apparatus for the combined operating of a magneto-inductive flow measuring arrangement and an electric motor.

The object is achieved by means of a apparatus including: A magnet arrangement, which produces an alternating magnetic field at two locations, wherein, at the first location, the magnetic field passes through a measuring tube transversely to a longitudinal axis of the measuring tube, wherein, associated with the measuring tube is at least one measuring electrode, in which a measuring current dependent on flow of a medium is induced, wherein, at the second location, the magnetic field is so developed that it drives an electric motor; at least one measuring element (7), which registers a variable for controlling the magnet arrangement (2) required for operating the electric motor (10) and the flow measuring arrangement (11); and wherein the control/evaluation unit delivers, on the basis of the voltage induced in the measuring electrode, information concerning the volume flow of the medium in the measuring tube. Thus, according to the invention, a common apparatus for magnetic field production is applied for providing two magnetic fields at least two different locations.

In an advantageous further development of the apparatus of the invention, the magnet arrangement includes two symmetrically arranged, elongated, magnet cores, on which at least one current coil is arranged. Preferably, each magnet core includes two pole shoes, of which one pole shoe is associated with the electric motor and one pole shoe is associated with the flow measuring arrangement.

An advantageous further development of the apparatus of the invention provides that the electric motor is a drive for operating a pump. Considered especially advantageous is when the pump is a wash-solution pump in a washing machine or a circulation pump in a heating or cooling system.

Advantageously in connection with the apparatus of the invention, the electric motor is a shaded, or split, pole motor.

An advantageous embodiment of the apparatus of the invention provides a magnetic field sensor, which detects the magnetic field in the immediate vicinity of the flow measuring arrangement during a measuring phase; the measured values delivered by the magnetic field sensor are taken into consideration by the control/evaluation unit in determining the volume flow of the medium through the measuring tube.

An alternative embodiment of the apparatus of the invention, in which fluctuations of the magnetic field of the magneto-inductive flow measuring arrangement are indirectly measured, provides a current meter, which determines the coil current flowing through at least one of the coils and which considers measured fluctuations of the coil current in the determining of the volume flow of the medium through the measuring tube.

BRIEF DESCRIPTION OF THE DRAWING

The invention will now be described on the basis of an example of an advantageous embodiment presented in the drawing, the sole FIGURE of which shows as follows.

DESCRIPTION OF THE PREFERRED EMBODIMENT

Figure 1:
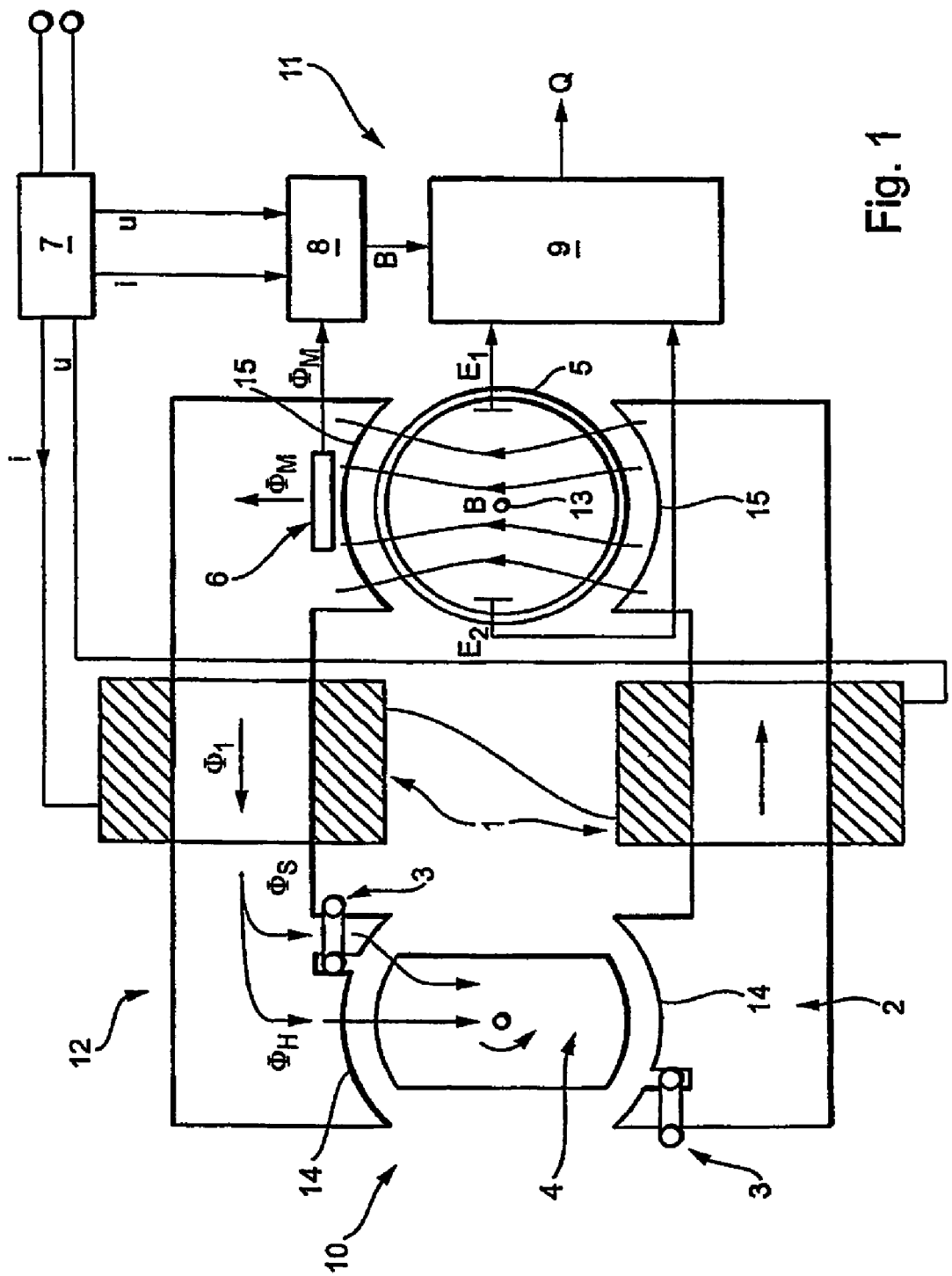
FIG. 1 a schematic, block diagram of components of the invention.

FIG. 1 shows a combination of an electric motor 10 and a flow measuring arrangement 11, wherein the magnetic fields $\phi_H$, $\phi_S$; $\phi_M$ are produced via the same magnet arrangement 2 and the same coil arrangement 1.

The coil arrangement 1, through which a time-varying current i flows, produces in the magnet arrangement 2 a time-varying magnetic field $\phi_1$. This magnetic field $\phi_1$ is, as shown in the left side of FIG. 1, used for driving an electric motor 10, and, as shown on the right side of FIG. 1, applied for operating a magneto-inductive flow measuring arrangement 11. The electric motor 10 is, in the present case, a shaded pole motor. For producing a moving, stator field for the shaded pole motor, the magnetic field $\phi_1$ is divided with the help of the short-circuit rings 3 into two spatially offset, alternating fields $\phi_H$, $\phi_S$. The two alternating magnetic fields $\phi_H$, $\phi_S$ are phase-shifted in time relative to one another. Regarding the manner in which the electric motor 10 in the form of a shaded pole motor works, reference is made to the corresponding state of the art.

On the right side, the magnetic field $\phi_1$, likewise conveyed by the magnet arrangement 2, is brought geometrically so through the measuring tube 5 that, in the interior of the measuring tube 5, the magnetic field lines of the magnetic field $\phi_M$ pass through in the manner required for operating the magneto-inductive flow measuring apparatus 11.

Situated in the measuring tube 5 are two electrodes $E_1$, $E_2$. Between these electrodes $E_1$, $E_2$, a voltage, induced due to the medium flowing through the measuring tube, is measurable. The voltage is proportional to the induction B and the flow velocity v of the medium. Magneto-inductive flow measuring arrangements, per se, are known sufficiently from the state of the art.

For calculating the flow Q of the medium through the measuring tube 5, the diameter of the measuring tube 5, the voltage induced in the electrodes $E_1$, $E_2$, and the size of the induction B are required. Operation of the electric motor can lead to fluctuations of the induction B. The instantaneous value of the induction B is, therefore, as proposed in a further development of the apparatus, registered by a measuring element 8; the measured, or determined, value is then fed to the flow calculator 9. The induction B can be determined directly by measuring the magnetic field with a magnetic field sensor 6; beyond that, it is possible to determine the induction B indirectly by measuring the coil current i and the coil voltage u. For this purpose measuring element 7 is provided, which measures the current i or the voltage u.

This combination of electric motor 10 and flow measuring arrangement 11 can be used anywhere where the accuracy of the flow measurement is not of the highest importance, e.g. where, primarily, a monitoring of the existence of a flow is intended. A practical example is, for instance, a washing machine, where a washing-solution pump and a flow measuring arrangement 11 are used. A further example is the circulatory system of a water cooler or water heater.

Shoe poles 14 and 15 are provided. Shoe element 14 is associated with the electric motor 10 and the shoe pole 15 is associated with the flow measuring arrangement. The electric motor and flow measuring arrangement are operated together by the same coil arrangement.

The invention claimed is:

1. An apparatus for measuring flow of a medium flowing through a measuring tube directed along a longitudinal axis of the measuring tube, comprising:
   an electric motor;
   a control/evaluation unit;
   at least one measuring device;
   a flow measuring arrangement; and
   a magnet arrangement, which produces an alternating magnetic field at a first location and at a second location, wherein:
   a magnetic field ($\phi_M$) at said first location passes through the measuring tube transversely to the longitudinal axis of the measuring tube;
   associated with the measuring tube is at least one measuring electrode in which a measuring current is induced, dependent on flow of the medium;
   a magnetic field at said second location of said two locations is so developed, that it drives said electric motor;
   said at least one measuring arrangement registers at least one variable for controlling said magnet arrangement, as required for operating said electric motor and said flow measuring arrangement; and
   said control/evaluation unit delivers, on the basis of the measuring voltage induced in said measuring electrodes, information concerning volume flow of the medium in the measuring tube.

2. The apparatus as claimed in claim 1, wherein:
   said magnet arrangement comprises two symmetrically arranged, elongated, magnet cores, for which at least one current coil is provided.

3. The apparatus as claimed in claim 2, wherein:
   the magnetic core in each magnet arrangement includes a set of two pole shoes, of which a first set is associated with said electric motor and a second set is associated with said flow measuring arrangement.

4. The apparatus as claimed in claim 1, wherein: said electric motor is a drive for operating a pump.

5. The apparatus as claimed in claim 4, wherein:
   the pump is one of: a washing-solution pump in a washing machine and a circulation pump in a heating or cooling system.

6. The apparatus as claimed in claim 1, wherein:
   said electric motor is a shaded pole motor.

7. The apparatus as claimed in claim 1, further comprising: a magnetic field sensor, wherein:
   said magnetic field sensor detects the magnetic field in the immediate vicinity of said flow measuring arrangement during a measuring phase; and
   said control/evaluation unit takes into consideration the magnetic field in determining volume flow of the medium through the measuring tube.

8. The apparatus as claimed in claim 1, further comprising:
   a current meter, which measures the coil current flowing through at least one of the coils of said magnet arrangement and which takes measured fluctuations of the coil current into consideration in determining volume flow of the medium through the measuring tube.

* * * * *